United States Patent [19]

Ota et al.

[11] Patent Number: 4,915,188

[45] Date of Patent: Apr. 10, 1990

[54] STORAGE COMPARTMENT FOR A MOTORCYCLE

[75] Inventors: Kozo Ota; Masahiro Sato, both of Saitama; Kenichi Sueda, Tokyo, all of Japan

[73] Assignee: Honda Giken Kogyo Kabushiki Kaisha, Tokyo, Japan

[21] Appl. No.: 104,997

[22] Filed: Oct. 6, 1987

[30] Foreign Application Priority Data

Oct. 14, 1986 [JP] Japan .................. 61-157046[U]

[51] Int. Cl.⁴ .................. B62D 39/00; B62J 9/00
[52] U.S. Cl. .................. 180/219; 224/39; 220/1 V; 180/227
[58] Field of Search .......... 180/219, 227, 228; 280/289 A; 224/32 R, 32 A, 33 R, 33 A, 35, 36, 42.11; 220/1 V

[56] References Cited

U.S. PATENT DOCUMENTS

| | | |
|---|---|---|
| 2,225,914 | 12/1940 | Lewis et al. . |
| 3,779,597 | 12/1973 | Uchida . |
| 3,788,532 | 1/1974 | Bish . |
| 3,882,951 | 5/1975 | Conley . |
| 3,927,727 | 12/1975 | Hanagan .................. 180/219 |
| 4,265,332 | 5/1981 | Presnall et al. . |
| 4,413,700 | 11/1983 | Shiratsuchi .................. 180/219 |
| 4,428,451 | 1/1984 | Yamaoka . |
| 4,438,877 | 3/1984 | Jackson . |
| 4,441,574 | 4/1984 | Kohyama et al. . |
| 4,460,057 | 7/1984 | Kohyama .................. 180/219 X |
| 4,519,473 | 5/1985 | Ochiai et al. . |
| 4,522,442 | 6/1985 | Takenaka . |
| 4,577,719 | 3/1986 | Nomura et al. . |
| 4,579,190 | 4/1986 | Hashimoto et al. . |
| 4,619,476 | 10/1986 | Kawasaki . |
| 4,633,965 | 1/1987 | Tsurumi et al. . |
| 4,666,009 | 5/1987 | Yashima et al. .................. 180/219 X |
| 4,679,647 | 7/1987 | Komuro .................. 180/219 |
| 4,697,664 | 10/1987 | Kohyama .................. 180/227 X |
| 4,721,178 | 1/1988 | Ito . |

FOREIGN PATENT DOCUMENTS

| | | |
|---|---|---|
| 513935 | 12/1978 | Canada . |
| 2532897 | 3/1984 | France . |
| 477708 | 2/1953 | Italy . |
| 800488 | 8/1958 | United Kingdom . |
| 819690 | 9/1959 | United Kingdom . |
| 1537233 | 12/1978 | United Kingdom . |
| 2054477 | 2/1981 | United Kingdom . |

Primary Examiner—Richard A. Bertsch
Attorney, Agent, or Firm—Lyon & Lyon

[57] ABSTRACT

A motorcycle of the sitting-, or motor scooter-, type is arranged to provide a storage compartment of increased storage capacity beneath the vehicle seat while allowing the seat to be disposed at a relatively low level in order to permit the vehicle, when in an operating mode, to have a low center of gravity.

12 Claims, 6 Drawing Sheets

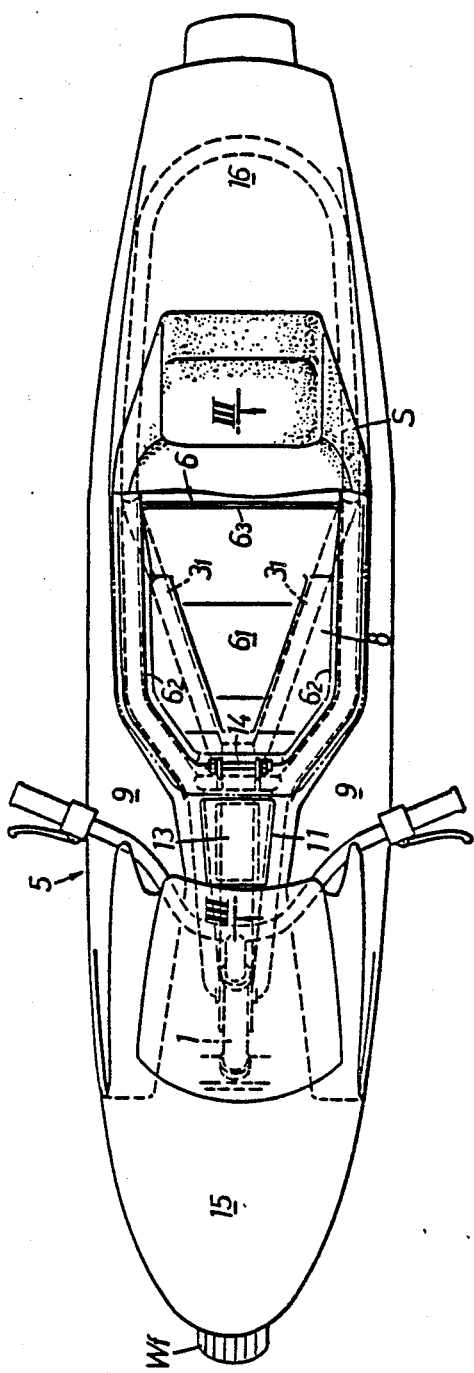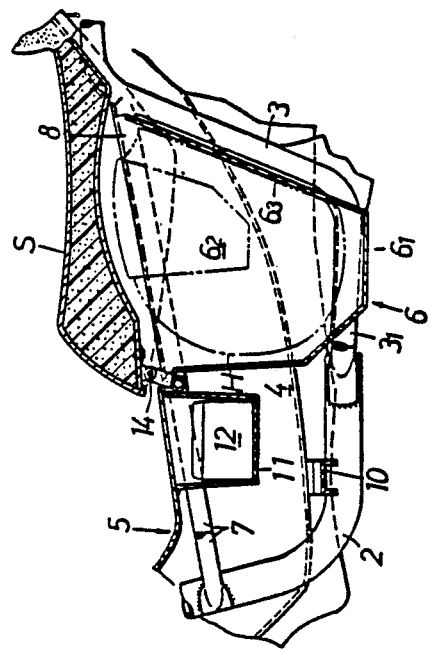

STORAGE COMPARTMENT FOR A MOTORCYCLE

BACKGROUND OF THE INVENTION

This invention relates to a motorcycle of the sitting type, otherwise known as a motor scooter and, particularly, to an organization thereof that enables the provision of a storage compartment of increased capacity.

Motorcycles of the sitting type provided with a storage compartment are well known, such apparatus being described in Japanese Patent Disclosure No. Sho 60-154964 Official Bulletin and in Japanese Utility Model Disclosure No. Sho 61-201987 Official Bulletin. Such motorcycles have certain attendant problems explainable by the fact that in recent years, it is obligatory for the rider of a motorcycle to wear a helmet when he rides, even though the motorcycle may be of small displacement and, therefore, of small physical size. In conventional motorcycles of this type therefore the storage is provided under the rider's seat, and further, the power unit is vertically swingably provided under the storage compartment. It is, therefore, necessary to provide sufficient space under the storage compartment to allow the power unit to swing. This results in the problem that the capacity of the storage compartment must accordingly be restricted. This restriction is particularly acute when it is desired that the seat be located in a low position on the vehicle in order to lower the center of gravity of the vehicle.

Moreover, if a storage compartment of increased capacity is provided simply under the seat in an ordinary scooter type vehicle, it raises the problem that the seating position becomes high. Consequently, if a compartment capable of storing a helmet or the like is to be insured, it is impossible to store another relatively large article with the helmet.

Therefore, it is an object of this invention to solve the aforementioned problems and to provide a motorcycle of the sitting type having a storage compartment of large capacity as, for example, a capacity sufficiently large to permit storage of at least one article, such as a helmet, or the like, and yet to enable the vehicle to have a low center of gravity.

SUMMARY OF THE INVENTION

In order to accomplish the abovementioned object, one aspect of the invention provides suspending, by the rear part of the body frame, the power unit of the motorcycle that pivotally mounts a rear wheel; placing a storage compartment on the body frame in front of the power unit; providing a pivotably connected rider's seat that can also be used as an operable cover for the storage compartment on an access opening thereto at the top of such opening; and providing a left and a right footrest in a low position in front of the seat.

In accordance with the aforementioned, a storage compartment of large capacity is provided in a motorcycle of the sitting type under the rider's seat and in front of the power unit, thereby enabling the ready storage of a relatively large article, such as a rider's helmet, or the like, and a vehicle having a relatively low center of gravity.

According to another aspect of the invention, storage of both a helmet and another large article can be achieved by extending the bottom wall of the storage compartment in a stepped manner from a location under the forward part of the vehicle seat to the rear part thereof and, thence, over the power unit and the wheel.

For a better understanding of the invention, its operating advantages, and the specific objects obtained by its use, reference should be made to the accompanying drawings and description which relate to a preferred embodiment of the invention.

BRIEF DESCRIPTION OF THE DRAWINGS

FIG. 2 is a plan view, partly in section, of the motorcycle of FIG. 1;

FIG. 3 is a fragmentary sectional view taken along line III—III of FIG. 2;

DESCRIPTION OF THE PREFERRED EMBODIMENTS OF THE INVENTION

Figure 1:
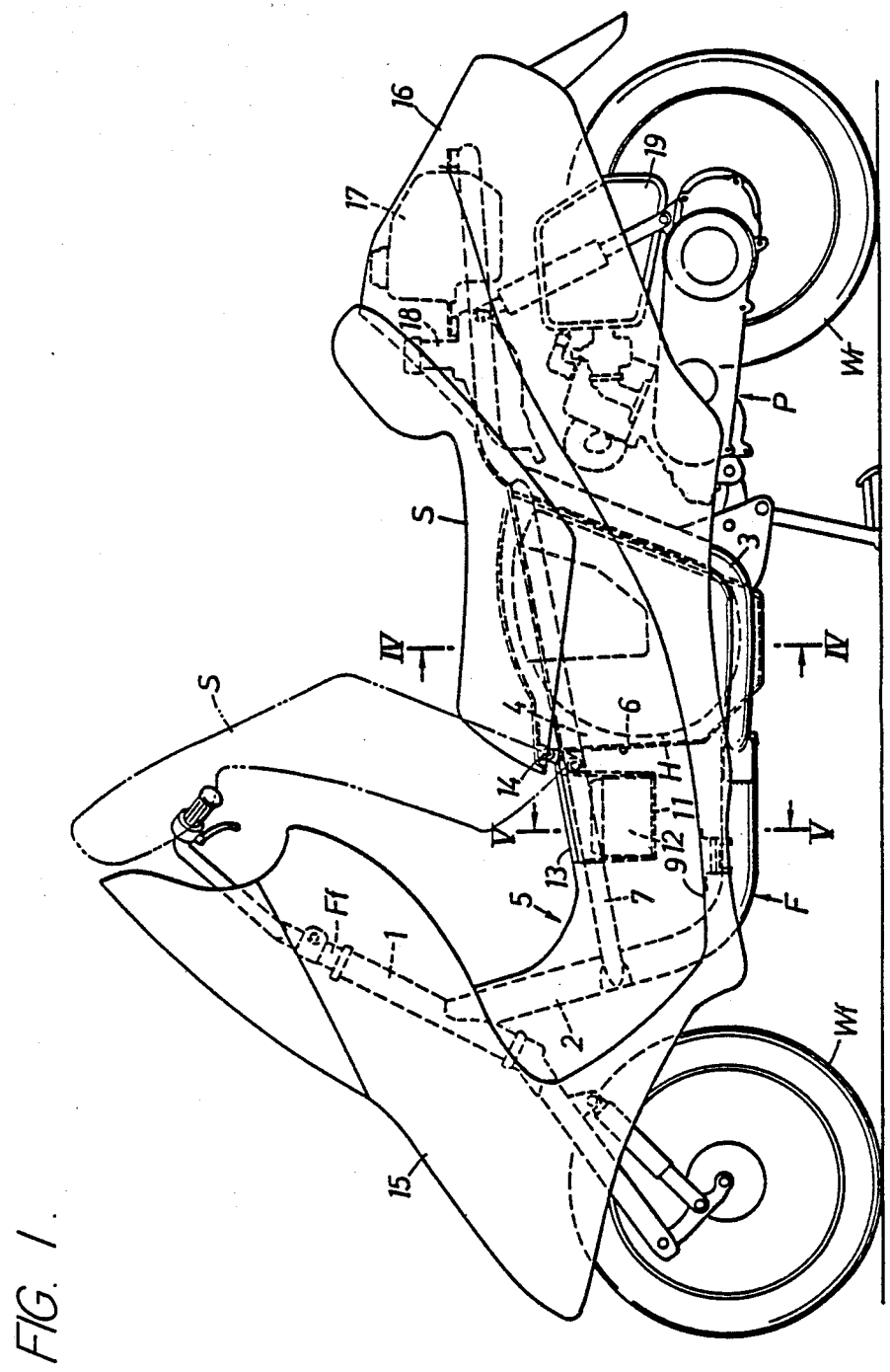
FIG. 1 is a side view of a motorcycle of the sitting type constructed according to the present invention.

A motorcycle of the sitting type steerably supports, by the front part of its body frame F, a front fork Ff that pivotally mounts a front wheel Wf and suspends, from the rear part, a vertically swingable power unit P that rotatably mounts a rear wheel Wr. The body frame F includes a front frame 2 of L shape in side view, which is connected at its front end to a head pipe 1. The front frame 2 extends to the rear, and is connected at its rear end to the front end of a rear frame 3. The rear frame 3 is of bifurcate form, forking into a left and a right branch and formed into a gooseneck shape in side view, as shown in FIG. 3. Left and right side reinforcement frames 7 provide structural support between the front and rear frames 2 and 3. In front of the power unit P a relatively large space 4 is formed above the body frame F. This space is separated from the power unit P by the rear frame 3, and in the rear half of the space 4 is positioned a storge compartment 6 that is enclosed in part by the plastic body 5 which covers the body frame F.

Figure 4:
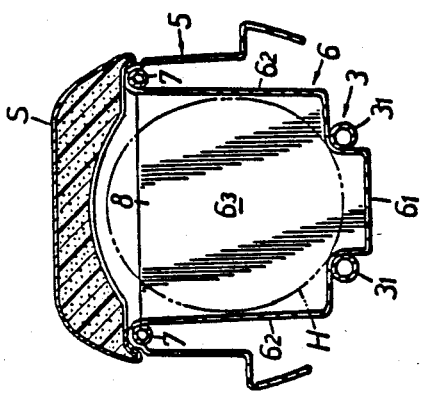
FIG. 4 is a sectional view taken along line IV—IV of FIG. 1.

As shown in FIGS. 3 and 4, the storage compartment 6 is formed at the middle of its bottom $6_1$ as a U-shape in longitudinal section and is supported by a substantially horizontal front part $3_1$ of the rear frame 3. The oppositely spaced sides walls $6_2$ of the compartment 6 are positioned laterally outwardly from the front part $3_1$ of the rear frame 3, projecting sideways to the left and right. The upper edges of the side walls $6_2$ are turned over and bent into an inverted U-shape and supported by the reinforcement frames 7. The rear wall $6_3$ of the storage compartment 6 rises obliquely rearwardly in close, parallel relation to the rear frame 3. An enlarged access opening 8 is formed at the top ends of the sidewalls $6_2$ and rear wall $6_3$, enabling storage of luggage, particularly luggage including a relatively large article, such as the helmet H of a rider.

Figure 5:
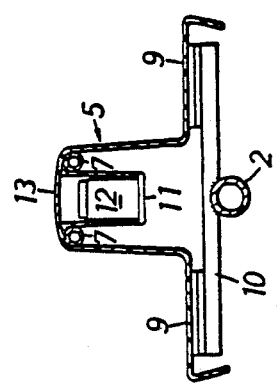
FIG. 5 is a sectional view taken along line V—V of FIG. 1.
Figure 9:
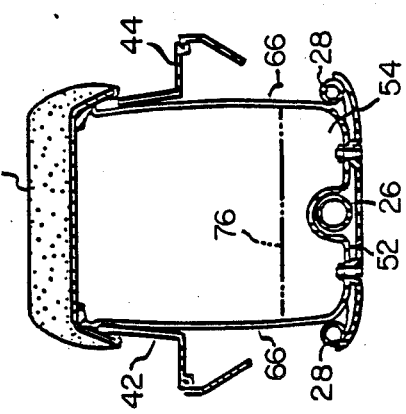
FIG. 9 is a sectional view taken along line IX—IX of FIG. 6.
Figure 7:
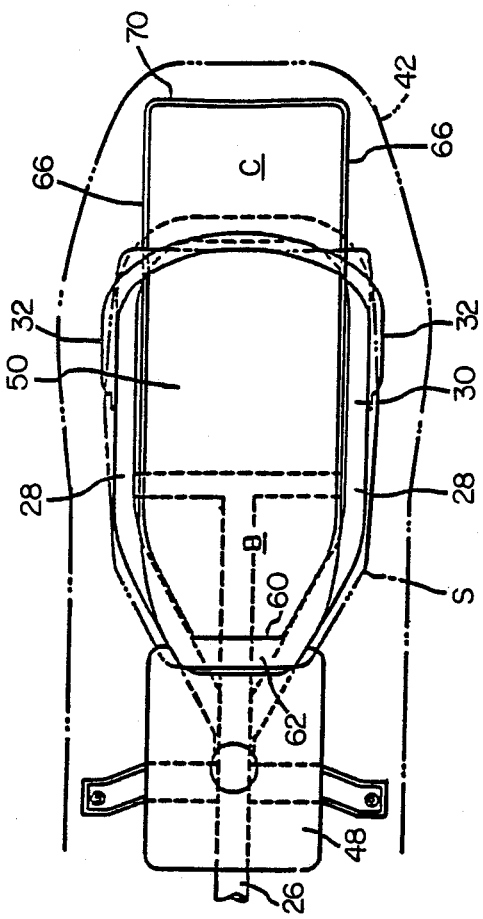
FIG. 7 is a plan view of the motorcycle of FIG. 6.

As shown in FIGS. 1 and 2, forwardly of the storage compartment 6 are provided left and right side footrests 9, that are formed by the same integral covering 5 that covers the storage compartment 6. These footrests 9 are supported, as shown in FIG. 5, by a support frame 10 secured to the bottom of the front frame 2 and extending laterally therefrom. Furthermore, between the footrests 9 is provided a battery box 11 that is integrally formed with the walls of the storage compartment 6 in the covering 5. The battery box 11 stores a battery 12 and has an opening at the top that is closed by a cover 13.

The access opening 8 at the top of the storage compartment 6 is closed by the seat S. The seat S, which is hinged to the body frame F by its front part at the front upper edge of the storage compartment 6, is vertically pivotable, as shown by solid line and chain line in FIG. 1, and is sufficiently wide so as to serve also as a cover for the storage compartment.

As is clear from FIG. 1, the storage compartment 6 is positioned in front of the power unit P, above the body frame F, and the rider's seat S is positioned on the top of the storage compartment, so that the seat S, though located on the storage compartment, is able to be located at a relatively low position on the motorcycle. Also, although the seat S may be wide, the described storage compartment organization permits the rider to place his feet on the left and right footrests comfortably.

In the drawing figures, 15 and 16 are a front and rear cowl, respectively, that form a part of the covering body 5. Numeral 17 indicates an oil tank; numeral 18 indicates a fuel tank; and numeral 19 indicates an air cleaner.

The operation of the hereindescribed motorcycle arrangement is as follows. When the seat S is turned upward, as shown by the chain line representation in FIG. 1, the access opening 8 of the storage compartment 6 is opened, thereby enabling articles to be stored in the storage compartment. The storage compartment 6 is formed sufficiently wide as to extend the full width of the rear frame 3 of the body frame F and the rear wall 6₃ of the compartment is inclined to the rear toward the access opening 8 so as to extend along the rear frame 3 of the body frame F. Thus, the storage compartment 6 has great capacity and a wide access opening 8, whereby a large article, like a helmet H, can be readily stored, and is easily accessible.

Although the rider's seat S is preferably formed wide so as to close the wide access opening 8 of the storage compartment 6, it is located in front of the power unit P and placed at a relatively low position on the motorcycle, so that the rider, sitting on the seat S, can place both his feet on the left and right footrests comfortably.

As seen from the foregoing, in accordance with this invention, a storage compartment is located on the body frame of a motorcycle, suspended at the rear thereof. An access opening, provided at the top of the storage compartment hingedly attached a rider's seat that is used also as a cover for the storage compartment. Left and right footrests are arranged in front of the seat, so that it is possible to provide the body frame with a storage compartment of relatively large capacity and having a wide access opening. Thus it is possible for relatively large articles, like a helmet, to be stored in the storage compartment, and to be readily accessible therein.

As a result of the arrangement, the rider's seat, even when it is formed wide so as to be used also as a cover to close the access opening of the storage compartment, can be placed at low position on the motorcycle without hindering by the power unit. A rider, therefore, who mounts the wide seat, is able to place both of his feet comfortably on the left and right footrests in front of the storage.

The embodiment of the invention illustrated in FIGS. 6 to 9 involves a motorcycle having a footrest space A of the low floor type disposed between front wheel FW and rear wheel RW. The body frame is provided with a head pipe 22 for rotatably supporting the operating shaft 24 of the steering handle, which shaft carries a front fork for rotatably mounting the front wheel FW. A front frame 26 is connected to the head pipe 22 and extends downwardly and rearwardly substantially along the longitudinal axis of the vehicle toward the rear thereof. A pair of left and right sub-frame members 28 connect at their forward ends to the left and right side, respectively, of the front frame 26. The sub-frame members 28 extend oppositely outwardly from the front frame 26 toward the vehicle rear and, in the region indicated as 30, are inclined upwardly, first, at a steep angle and, thereafter, at a shallow angle before being joined together at the vehicle rear above the rear wheel RW.

A U-shaped frame 32 having its legs connecting with the legs of the sub-frame members 28 and being substantially parallel thereto in the steeply inclined region 30 thereof. A pair of stiffening struts 34 connect integrally between the inclined frame 32 and the sub-frame 28 in the region 30.

Projections 36 extend outwardly from each of the sub-frame members 28 at the intersection of the horizontally extending and inclined portions thereof. A power unit 38 rotatably mounting the rear wheel RW is pivotally connected for vertically swingable movement to the projections 36. Movement of the power unit 38 is damped by a cushion 40 that extends between the power unit and the rear portion of the frame 30.

Figure 8:
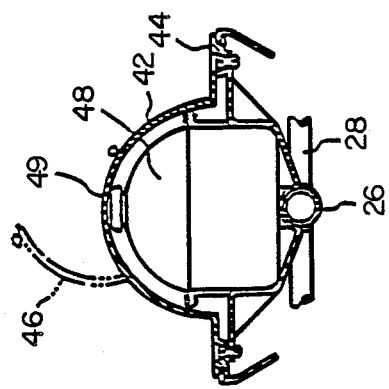
FIG. 8 is a sectional view taken along line VIII—VIII of FIG. 6.

The entire motorcycle body is covered by a body cover 42 that, as shown in the figures, extends over the body front, the footrest space A, the opposite sides and rear of the rear portion of the vehicle. A curved portion of the body cover 42 extends over a fuel tank 48 disposed in space A in the middle thereof. The opposite sides of the curved portion of the cover 42 are offset laterally outwardly as shown in FIG. 8 to form the low footrests 44 on the left and right sides of the vehicle. An opening is provided in the cover 42 over the fuel filler opening 49 of the fuel tank 48, which opening is closed by a pivotable lid 46.

Storage compartment 50 is provided interiorly of the cover 42 extending from a position adjacent the rear of the fuel tank 48 to a position over the power unit 38 and rear wheel RW. The compartment 50 may be provided with a large, integrally molded container of plastic material, such as, for example, polycarbonate. The container comprises a bottom wall 52, a front wall 60, left and right side walls 66, and a back wall 70. The seat S is pivotally mounted on the container front wall 60 by a hinge 72 so as to be vertically swingable to permit access to the compartment 50. The hinge 72 is formed on the wall 60 by a flange 62 that extends outwardly from the wall and a reinforcement piece 64 extending from the underside of the flange to the wall for stiffening the flange.

Figure 6:
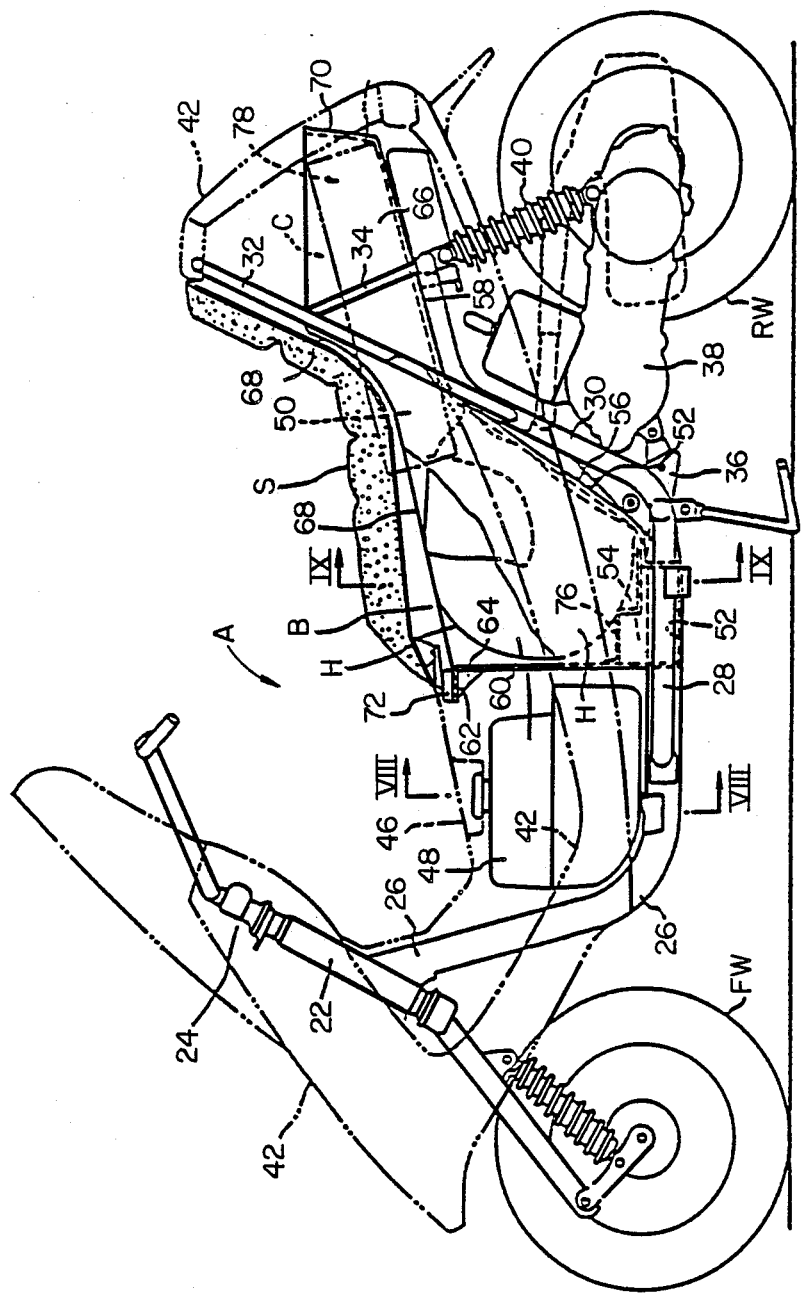
FIG. 6 is a side view of a motorcycle of the sitting type constructed according to another embodiment of the invention.

The base plate of the seat S is curved, as shown in FIG. 6, and provides a seatback portion in contact with the upper sides 68 of the side walls 66 which are similarly curved. The baseplate in the seatback region is also in contact with the upper half of the inclined frame 32. Thus, the load of the seat S and the weight of an occupant are supported by the front wall 60, both side walls 66 and the inclined frame 32.

The portion of the bottom wall 52 of the storage compartment 50 that is adjacent the fuel tank 48 and that defines the lowest part of the compartment is formed into a cavity 54 for storage of a battery or electrical parts, or the like, 74. A lid 76 covers the cavity 54 which is disposed at about the same elevation as the front frame 26 and the sub-frame members 28.

The compartment 50 includes a steeply inclined section 56 that extends from the cavity 54 in substantial conformity with the rear frame 30. A gently inclined section 58 extends from the section 56 along the rear frame 30, the sections of the compartment cooperating to define a generally stepped shape, as shown in FIG. 6. By providing the compartment with the stepped shape, the power unit 38 and rear wheel, that swing vertically, are avoided since the steeply inclined section 56 is located in front of the power unit and the gently inclined section 58 is located above the upper limit of the extent of pivoting permitted the power unit and rear wheel.

The described storage compartment organization is accessible by pivoting the seat S upwardly from the front end as a fulcrum. As shown, the compartment 50 is a chamber of sufficiently great capacity as will permit storage of a full face type helmet H in the front portion B thereof and of a relatively flat, wide article, such as, for example, an attache case 78 in the rear portion C. Because the portion B of the compartment 50 is deep, having its bottom at the same elevation as the horizontal portion of the front frame 26 and sub-frame 28, the height of the seat S can be set at a low position on the motorcycle. Consequently, the center of gravity of the motorcycle, when it is being ridden, is at a desirably low position, notwithstanding the fact that the storage compartment 50 covered by the seat S is of increased storage capacity.

Figure 10:
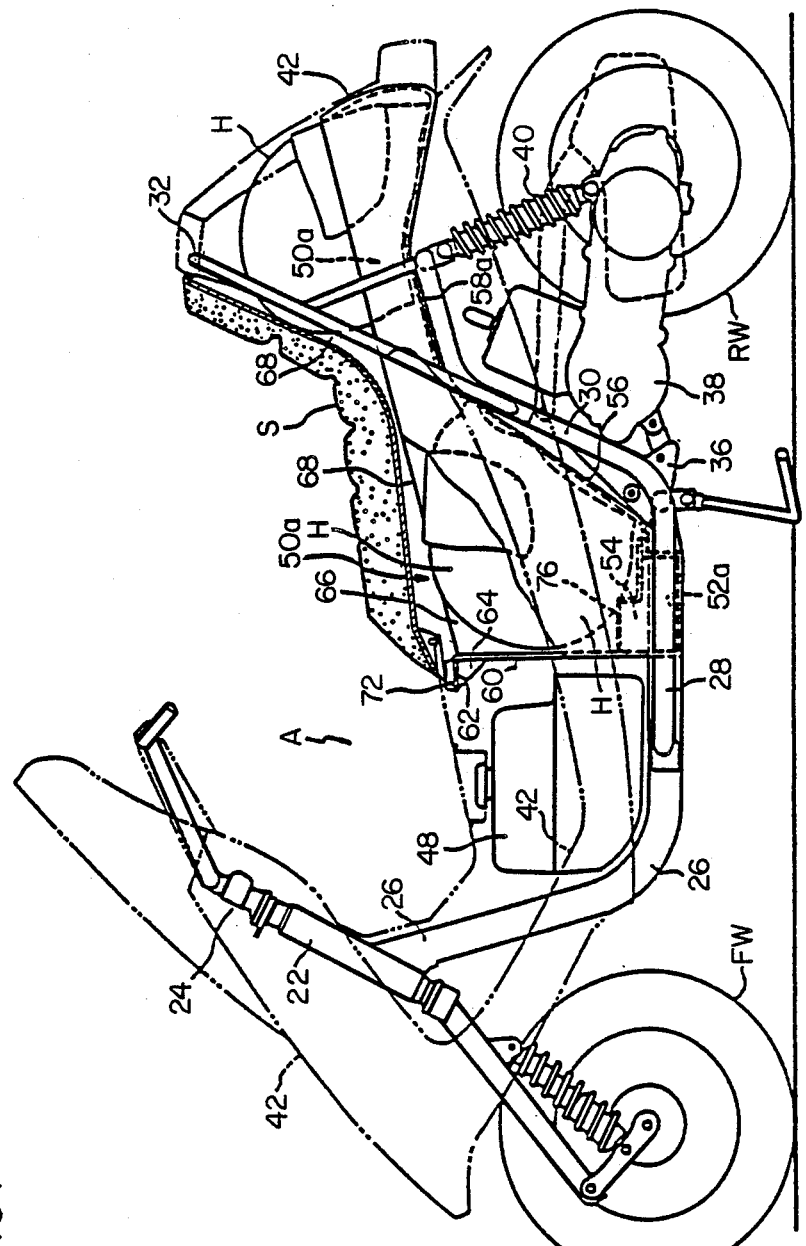
FIG. 10 is a side view of a motorcycle of the sitting type constructed according to yet another embodiment of the invention.

FIG. 10 illustrates another embodiment of the invention in which the bottom wall 52A, that extends through the various sections of the compartment 50A, is inclined downwardly from the rear end of the gently inclined section 58A. Thus, the rear storage section is deeper, thereby creating increased storage capacity capable, for example, of storing a second helmet H.

We claim:

1. A motorcycle of the sitting-type comprising:
 a body frame mounting a seat;
 a front wheel rotatably mounted at a forward part of said body frame;
 a power unit drivingly connecting a rear wheel in longitudinally spaced relation from said front wheel, said power unit being pivotally connected at its forward end to said body frame for vertically pivoted movement;
 said body frame including generally horizontally extending support means disposed supporting forwardly of said power unit and supporting footrests; and
 means forming a luggage storage compartment disposed forwardly of said power unit and extending vertically from a level substantially coincident with said footrest support means to said seat.

2. A motorcycle according to claim 1 in which said body frame includes:
 a head pipe,
 said support means including portions extending downwardly and rearwardly from said head pipe,
 said footrests being supported on said rearwardly extending portion of said support means; and
 said luggage storage compartment-forming means being vertically supported by said support means.

3. A motorcycle according to claim 2 in which said support means extends rearwardly and upwardly intermediate said storage compartment-forming means and said power unit.

4. A motorcycle according to claim 3 in which said support means is offset into overlying relation to said power unit, and said storage compartment-forming means includes front, rear and opposed side walls and a stepped bottom wall extending rearwardly of said vehicle in substantially parallel relation to said support means.

5. A motorcycle according to claim 4 in which said storage compartment includes a first portion in underlying relation to said vehicle seat and a second portion in overlying relation to said power unit.

6. A motorcycle according to claim 3 in which said footrests and support means therefor extend in laterally spaced relation on opposite sides of said body frame forwardly of said power unit and said luggage storage-compartment forming means has its lower end positioned between said footrest support means.

7. A motorcycle according to claim 1 in which said luggage storage compartment-forming means comprises generally rectangularly disposed upstanding front, rear and opposed side walls, said rear wall being inclined rearwardly for increasing the capacity of said storage compartment.

8. A motorcycle of the sitting type comprising:
 a body frame,
 longitudinally spaced front and rear wheels rotatably mounted at a forward and rearward location respectively on said body frame,
 a seat mounted on said body frame intermediate said wheels,
 a power unit supported by said body frame drivingly connecting said rear wheel,
 said body frame having a front portion including a head pipe and support means extending downwardly and rearwardly from said head pipe and a rear portion defined by said support means extending rearwardly and upwardly from said front portion,
 means forming footrests supported on said support means forwardly of said power unit,
 means forming a luggage storage compartment extending in the vertical direction from a level substantially coincident with said footrest support means to said seat, and
 means pivotally connecting said seat to said body frame for accessing the interior of said luggage storage compartment.

9. A motorcycle according to claim 8 in which said support means defining said body frame rear portion is disposed substantially intermediate said storage compartment and said power unit.

10. A motorcycle according to claim 9 including footrests intermediate said front and rear wheels, said support means including a generally horizontal portion supporting said footrests and said storage compartment extending upwardly from said horizontal portion of said support means.

11. A motorcycle according to claim 10 in which said support means is offset into overlying relation to said power unit, and said storage compartment-forming means includes front, rear and opposed side walls and a stepped bottom wall extending rearwardly of said vehicle in substantially parallel relation to said support means.

12. A motorcycle according to claim 10 in which said luggage storage compartment includes a first portion extending between said footrests and said vehicle seat and second portion in overlying relation to said power unit.

* * * * *